US012126978B2

(12) United States Patent
Liu et al.

(10) Patent No.: US 12,126,978 B2
(45) Date of Patent: Oct. 22, 2024

(54) SOUND GENERATING DEVICE

(71) Applicant: GOERTEK INC., Shandong (CN)

(72) Inventors: Huawei Liu, Shandong (CN); Guodong Zhao, Shandong (CN); Jie Li, Shandong (CN)

(73) Assignee: GOERTEK INC., Weifang (CN)

( * ) Notice: Subject to any disclaimer, the term of this patent is extended or adjusted under 35 U.S.C. 154(b) by 123 days.

(21) Appl. No.: 17/905,094

(22) PCT Filed: Dec. 5, 2020

(86) PCT No.: PCT/CN2020/134121
§ 371 (c)(1),
(2) Date: Aug. 26, 2022

(87) PCT Pub. No.: WO2021/169465
PCT Pub. Date: Sep. 2, 2021

(65) Prior Publication Data

US 2023/0115757 A1 Apr. 13, 2023

(30) Foreign Application Priority Data

Feb. 28, 2020 (CN) ......................... 202010133942.2

(51) Int. Cl.

| | |
|---|---|
| ***H04R 9/06*** | (2006.01) |
| ***H04R 1/02*** | (2006.01) |
| ***H04R 7/04*** | (2006.01) |
| ***H04R 7/18*** | (2006.01) |
| ***H04R 9/02*** | (2006.01) |
| ***H04R 9/04*** | (2006.01) |
| ***H04R 31/00*** | (2006.01) |

(52) U.S. Cl.
CPC ............... *H04R 9/06* (2013.01); *H04R 1/023* (2013.01); *H04R 1/025* (2013.01); *H04R 7/04* (2013.01);

(Continued)

(58) Field of Classification Search
CPC ........ H04R 3/04; H04R 1/025; H04R 1/2811; H04R 1/2896; H04R 1/2803;
(Continued)

(56) References Cited

U.S. PATENT DOCUMENTS

2009/0296970 A1* 12/2009 Chiu ...................... H04R 1/225
455/575.1
2014/0056464 A1* 2/2014 Li .......................... H04R 9/025
381/400

(Continued)

FOREIGN PATENT DOCUMENTS

CN 201986137 U 9/2011
CN 204578770 U 8/2015

(Continued)

OTHER PUBLICATIONS

International Search Report from International Application No. PCT/CN2020/134121 mailed Feb. 25, 2021.

*Primary Examiner* — Carolyn R Edwards
*Assistant Examiner* — Julie X Dang
(74) *Attorney, Agent, or Firm* — Shih IP Law Group, PLLC

(57) ABSTRACT

The present disclosure discloses a sound generating device, which comprises: a magnetic conductive yoke; a housing extending along an edge of the magnetic conductive yoke and having an annular shape, wherein a leakage opening is formed in a gap between the housing and the magnetic conductive yoke; and a metal mesh covering the leakage opening, wherein a portion of the metal mesh corresponding to the leakage opening is provided with a plurality of air holes. The sound generating device of the present disclosure can reduce the defective rate of products.

13 Claims, 11 Drawing Sheets

(52) U.S. Cl.
CPC ............... *H04R 7/18* (2013.01); *H04R 9/025* (2013.01); *H04R 9/045* (2013.01); *H04R 31/006* (2013.01)

(58) Field of Classification Search
CPC ............ H04R 2420/09; H04R 2420/07; H04R 1/2888; H04R 9/06; H04R 1/023; H04R 7/04; H04R 7/18; H04R 9/025; H04R 9/045; H04R 31/006
USPC ....... 381/400–409, 398, 332, 334, 389, 353, 381/394
See application file for complete search history.

(56) References Cited

U.S. PATENT DOCUMENTS

| | | | | |
|---|---|---|---|---|
| 2014/0211959 | A1* | 7/2014 | Boyajian | H04R 5/033 381/74 |
| 2014/0241567 | A1 | 8/2014 | Crosby et al. | |
| 2016/0057541 | A1 | 2/2016 | Porter et al. | |
| 2018/0255392 | A1* | 9/2018 | Wu | H04R 1/2811 |
| 2018/0302724 | A1* | 10/2018 | Li | H04R 1/06 |
| 2018/0310083 | A1* | 10/2018 | Liu | H04R 9/045 |
| 2020/0213751 | A1* | 7/2020 | Chen | H04R 1/02 |

FOREIGN PATENT DOCUMENTS

| | | | |
|---|---|---|---|
| CN | 205793279 | U | 12/2016 |
| CN | 107396267 | A | 11/2017 |
| CN | 206674194 | U | 11/2017 |
| CN | 208940235 | U | 6/2019 |
| CN | 209526869 | U | 10/2019 |
| CN | 110418260 | A | 11/2019 |
| CN | 209731559 | U | 12/2019 |
| CN | 111147986 | A | 5/2020 |
| CN | 210868143 | U | 6/2020 |
| KR | 20190019455 | A | 2/2019 |
| WO | WO-2021103070 | A1 * | 6/2021 |

* cited by examiner

SOUND GENERATING DEVICE

TECHNICAL FIELD

The present disclosure relates to the technical field of acoustic transducer, particularly, to a sound generating device.

BACKGROUND ART

In the sound generating devices of related technologies, in order to realize the full filling technology of the rear acoustic cavity, a mesh cloth is generally disposed on the leakage opening of the sound generating device, and the mesh cloth and the housing of the sound generating device are integrally molded by injection molding, or bonded by adhering.

However, since it is difficult to maintain the shape of the mesh cloth, a misalignment between the mesh cloth and the leakage opening during integral injection molding or bonding may occur, so that the defective rate of products is increased.

SUMMARY OF THE INVENTION

The main object of the present disclosure is to provide a sound generating device, and is intended to reduce the defective rate of products.

In order to achieve the above object, the sound generating device provided by the present disclosure comprises: a magnetic conductive yoke; a housing extending along an edge of the magnetic conductive yoke and having an annular shape, wherein a leakage opening is formed in a gap between the housing and the magnetic conductive yoke; and a metal mesh covering the leakage opening, wherein a portion of the metal mesh corresponding to the leakage opening is provided with a plurality of air holes.

Optionally, the metal mesh comprises a cover section and a connection section, the connection section is coupled to a surface of the magnetic conductive yoke away from the housing, the cover section covers the leakage opening, and the cover section is provided with the plurality of air holes.

Optionally, the surface of the magnetic conductive yoke away from the housing is provided with an escape groove, and the connection section is located in the escape groove.

Optionally, the connection section is coupled to the magnetic conductive yoke by welding or bonding.

Optionally, the sound generating device further comprises a magnetic circuit system and a vibration system, the magnetic circuit system comprises a central magnet and an edge magnet surrounding the central magnet, and a magnetic gap is formed between the central magnet and the edge magnet. The vibration system comprises a diaphragm, a voice coil and a support piece, and the voice coil extends into the magnetic gap. The support piece is located at one end of the voice coil close to the magnetic conductive yoke, and the support piece is electrically connected to the voice coil. A portion of the magnetic conductive yoke corresponding to the support piece is provided with an escape hole, and the connection section covers the escape hole.

Optionally, the sound generating device has a rectangular shape, each of four corners of the sound generating device is provided with one support piece, and each of four corners of the magnetic conductive yoke is provided with one escape hole correspondingly.

Optionally, an insertion port is provided at the housing and a side wall of the leakage opening, and the metal mesh is inserted into the insertion port.

Optionally, an edge of at least one of the magnetic conductive yoke and the housing is provided with a plurality of stop walls, and the stop walls of one of the magnetic conductive yoke and the housing extend towards and abut on the other one of the magnetic conductive yoke and the housing, wherein the leakage opening is formed by a space between adjacent two stop walls.

Optionally, a plurality of groups of locating structures are formed between the magnetic conductive yoke and the housing, and each group of the locating structures comprises two stop walls provided at the housing and one stop wall provided at the magnetic conductive yoke, wherein the stop wall of the magnetic conductive yoke is clamped between the two stop walls of the housing, and the leakage opening is formed by an interval between adjacent two groups of the locating structures.

Optionally, the sound generating device has a rectangular shape, and each of two short sides of the sound generating device is provided with one leakage opening, and each leakage opening is provided with one metal mesh correspondingly.

Optionally, a thickness of the metal mesh is less than or equal to 0.2 mm.

Optionally, the housing comprises a case portion and a mounting portion, the case portion is a metal part, the case portion extends along an outer edge of the magnetic conductive yoke and has an annular shape, a surface of the case portion facing the magnetic conductive yoke is provided with an escape notch, and the escape notch penetrates through an outer edge of the case portion outwardly, wherein the mounting portion is provided in the escape notch, and the mounting portion is a plastic part, and is integrally molded with the case portion by injection molding.

Optionally, the case portion comprises a metal ring and an annular magnetic conductive plate which are stacked one on another, the metal ring is coupled to an edge portion of a diaphragm, the annular magnetic conductive plate is provided on an edge magnet, a portion of an outer edge of the annular magnetic conductive plate is provided with an escape notch, the metal ring has a mounting area exposed by the escape notch, and the mounting portion is provided in the mounting area.

Optionally, the housing comprises a plastic case and a metal washer, each of the plastic case and the metal washer has an annular shape, and the plastic case and the metal washer are integrally molded by injection molding.

The present disclosure adopts the metal mesh. On the one hand, the metal mesh has large strength and hardness, and it can ensure that the metal mesh has a stable shape even if the thickness of the metal mesh is thin, so that the connection stability between the metal mesh and the housing or the magnetic conductive yoke can be ensured, the misalignment between the metal mesh and the leakage opening can be prevented, thereby improving the yield of the products. On the other hand, the metal mesh has high strength and may be used as a portion of the housing at the same time, so that it can protect the vibration system and magnetic circuit system inside the housing.

BRIEF DESCRIPTION OF THE DRAWINGS

In order to more clearly illustrate the embodiments of the present disclosure or the technical solutions in the prior art, the attached drawings that need to be used in the embodiments of the present disclosure or the descriptions of the prior art will be briefly described below. It is obvious that the attached drawings in the following description are only some embodiments of the present disclosure. For those skilled in the art, other drawings can be obtained according to the structures shown in these attached drawings without creative labor.

DESCRIPTION OF REFERENCE NUMERALS

Figure 1:
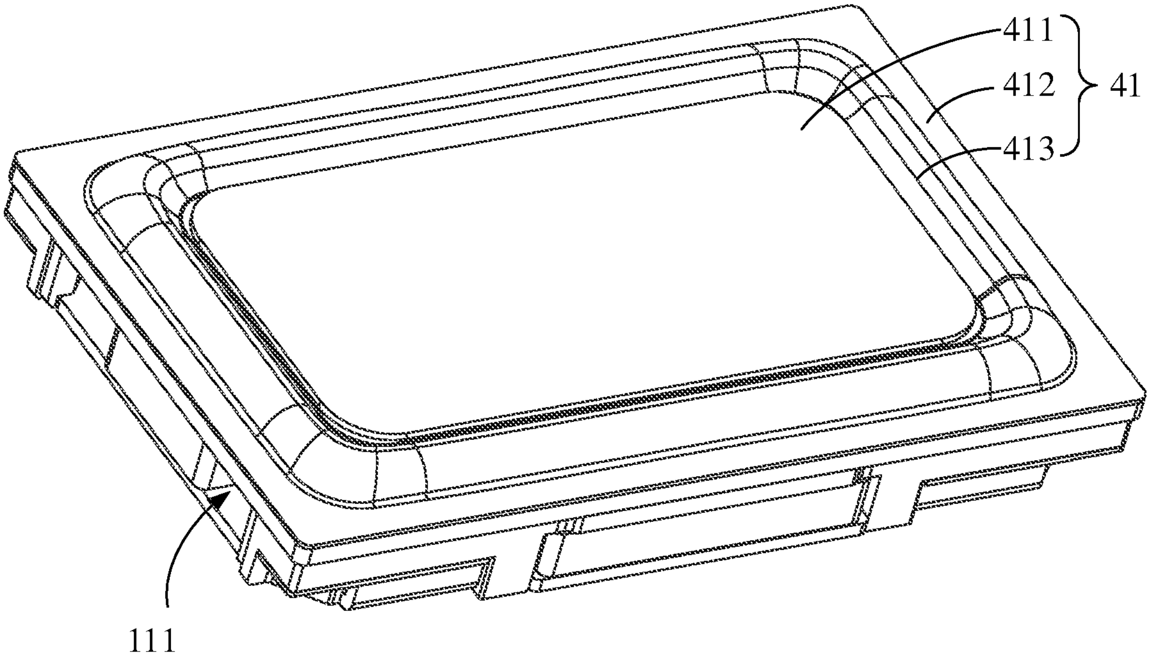
FIG. 1 is a schematic diagram of the structure of the sound generating device according to one embodiment of the present disclosure.
Figure 2:
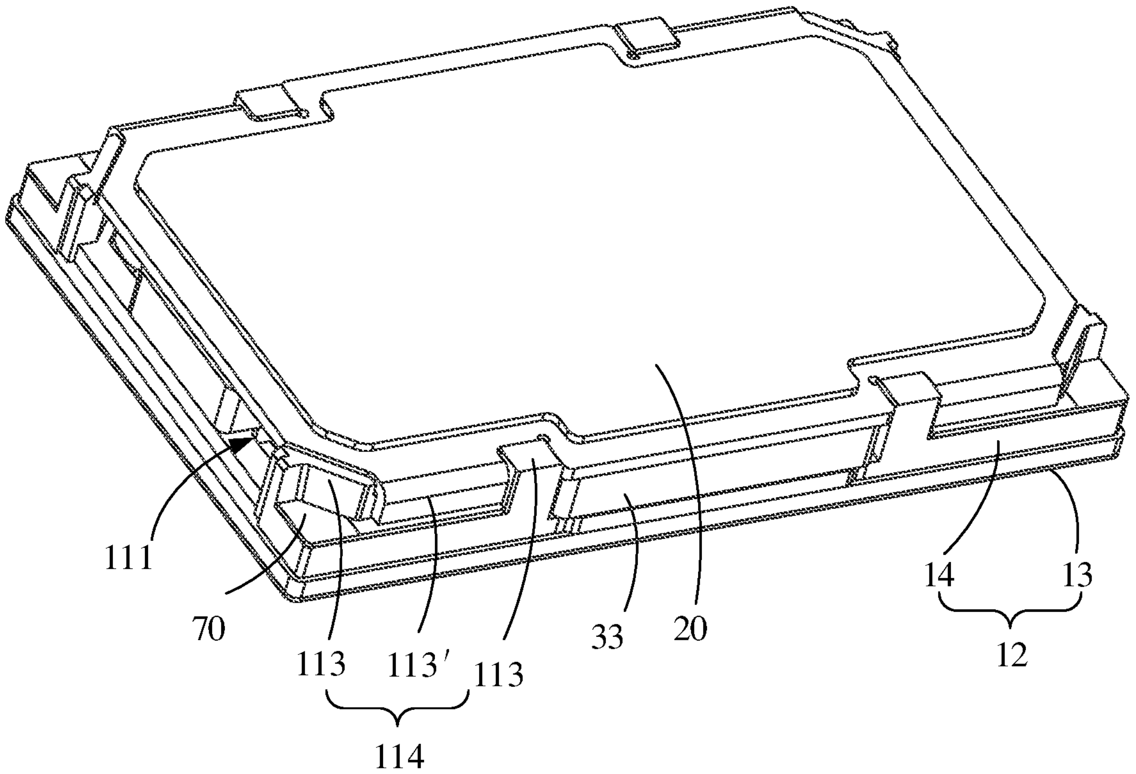
FIG. 2 is a schematic diagram of the structure of the sound generating device in FIG. 1 viewed from another perspective.
Figure 3:
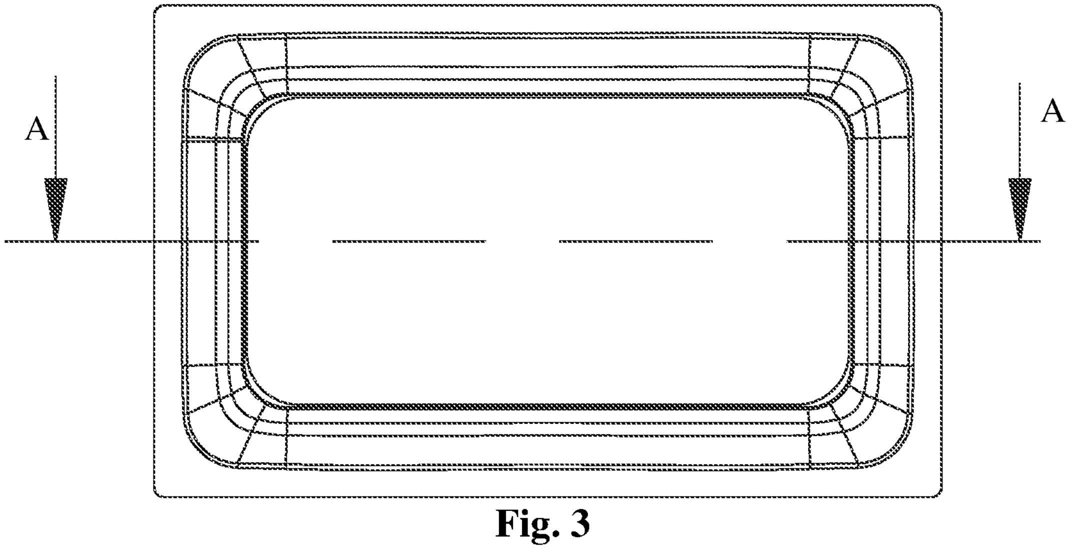
FIG. 3 is a schematic plan view of the sound generating device in FIG. 1.
Figure 4:
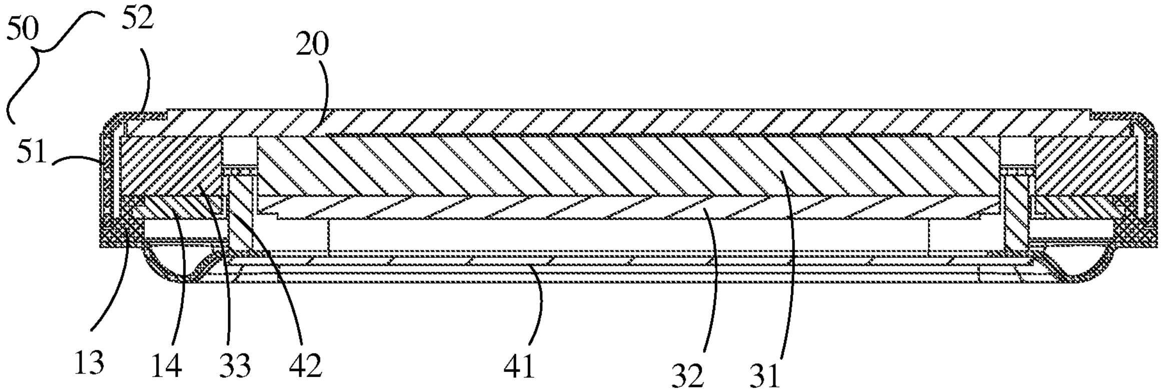
FIG. 4 is a schematic cross-section view of the sound generating device in FIG. 3 taken along line A-A.

| Reference Numeral | Name |
|---|---|
| 10 | housing |
| 111 | leakage opening |
| 112 | insertion port |
| 113/113' | stop wall |
| 114 | locating structure |
| 12 | case portion |
| 13 | metal ring |
| 131 | mounting area |
| 132 | gripping hole |
| 133 | first annular body |
| 134 | first edge washer |
| 14 | annular magnetic conductive plate |
| 141 | locating boss |
| 142 | gripping boss |
| 143 | gripping groove |

-continued

| Reference Numeral | Name |
|---|---|
| 144 | escape notch |
| 145 | second annular body |
| 146 | second edge washer |
| 15 | mounting portion |
| 16 | plastic case |
| 17 | metal washer |
| 20 | magnetic conductive yoke |
| 21 | escape groove |
| 22 | escape hole |
| 31 | central magnet |
| 32 | central magnetic conductive plate |
| 33 | edge magnet |
| 41 | diaphragm |
| 411 | center portion |
| 412 | edge portion |
| 413 | suspension annular portion |
| 42 | voice coil |
| 50 | metal mesh |
| 51 | cover section |
| 52 | connection section |
| 60 | support piece |
| 70 | pad |

The realization of the object, functional features and advantages of the present disclosure will be further described with reference to the attached drawings in combination with the embodiments.

DETAILED DESCRIPTION OF EMBODIMENTS

The technical solutions in the embodiments of the present disclosure will be clearly and completely described below in combination with the attached drawings in the embodiments of the present disclosure. Obviously, the described embodiments are only a part of the embodiments of the present disclosure, not all of them. Based on the embodiments in the present disclosure, all other embodiments obtained by those skilled in the art without creative labor belong to the protection scope of the present disclosure.

It should be noted that directional indications (for example, on, below, left, right, front, and rear . . . ) in the embodiments of the present disclosure are only used to illustrate the relative position relationship and motion between various parts under a specific attitude (as shown in the drawings), and the directional indications will change accordingly when the specific attitude is changed.

In addition, the description such as “first”, “second” and the like in the embodiments of the present disclosure is only for descriptive objects, and cannot be understood as indicating or implying the relative importance of the indicated technical feature or implicitly indicating the number of the indicated technical feature. Therefore, the feature defined with “first” or “second” may explicitly or implicitly comprise at least one such feature. In addition, the technical solutions between various embodiments can be combined with each other, but it must be based on the condition that those skilled in the art can realize the combination. When a combination of technical solutions is contradictory or impossible to realize, it should be considered that this combination of the technical solutions does not exist and is not within the protection scope of the present disclosure.

The present disclosure provides a sound generating device, which may be used in devices such as earphones, mobile phones, notebook computers, VR devices, AR devices, televisions, etc.

Figure 6:
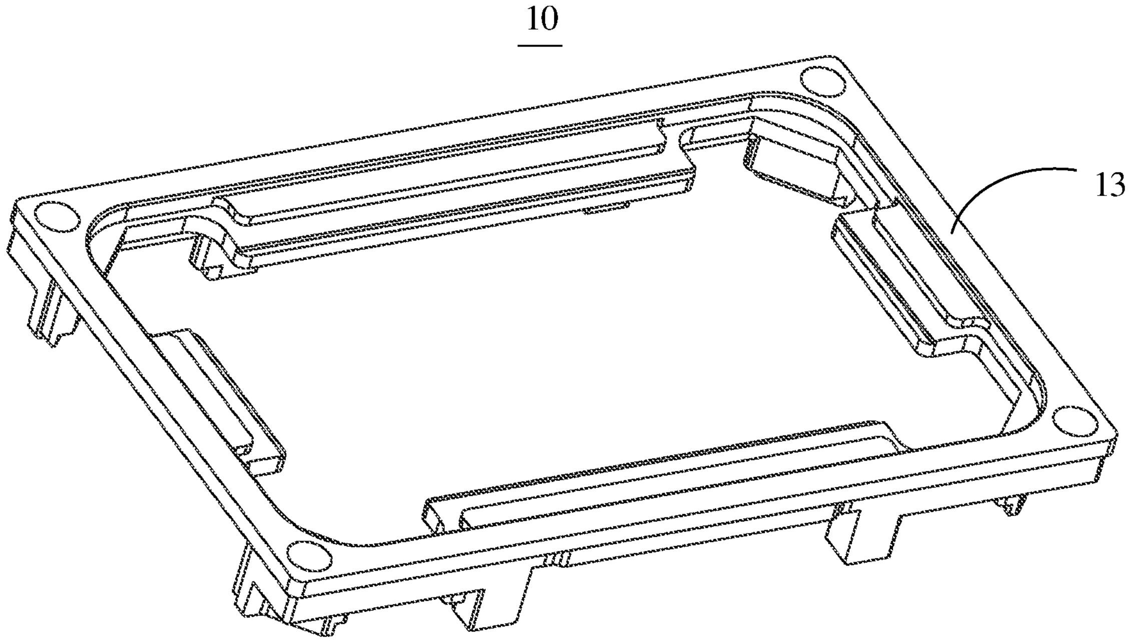
FIG. 6 is a schematic diagram of the structure of the housing in FIG. 1.
Figure 7:
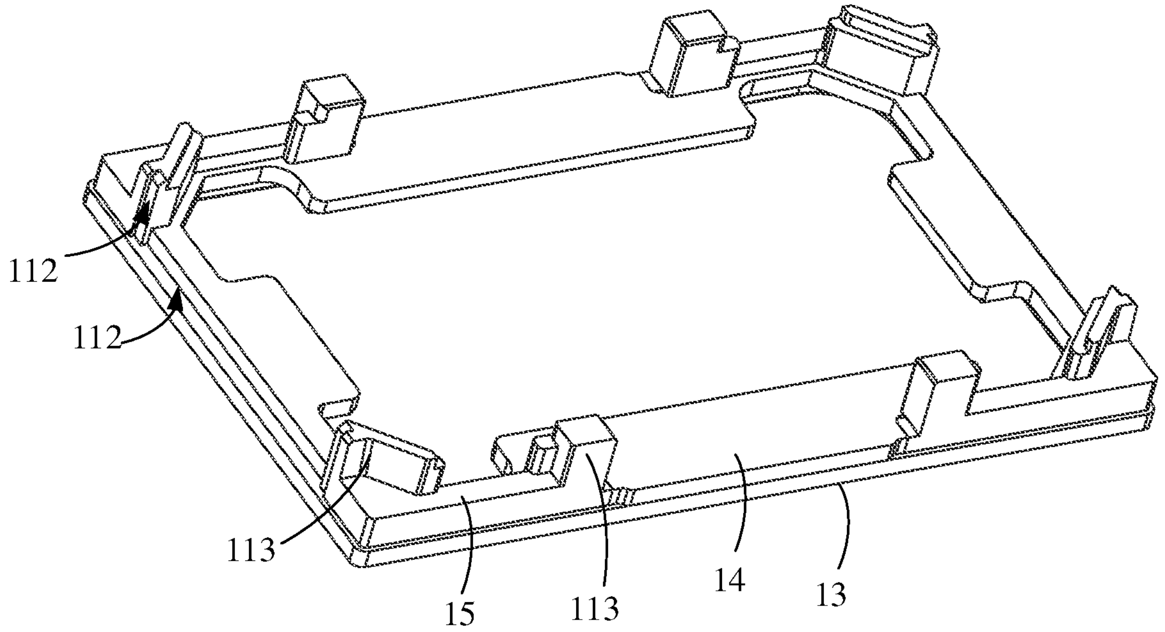
FIG. 7 is a schematic diagram of the structure of the housing in FIG. 6 viewed from another perspective.

Referring to FIGS. 1 to 4, the sound generating device comprises a housing 10 (as shown in FIG. 6), a vibration system, a magnetic circuit system and other parts.

The magnetic circuit system comprises a magnetic conductive yoke 20, on which an inner magnetic circuit part and an outer magnetic circuit part are provided. The outer magnetic circuit part surrounds the inner magnetic circuit part and is spaced apart from the inner magnetic circuit part, and a magnetic gap is formed by the gap between the inner magnetic circuit part and the outer magnetic circuit part.

For example, the inner magnetic circuit part comprises a central magnet 31 and a central magnetic conductive plate 32 provided on the central magnet 31. The outer magnetic circuit part comprises an edge magnet 33. The central magnet 31 and the edge magnet 33 are provided on the magnetic conductive yoke 20, and the central magnetic conductive plate 32 is provided on the central magnet 31. An edge magnetic conductive plate may extend along the circumferential direction of the magnetic conductive yoke 20 and have an annular shape, or each of two opposite sides of the magnetic conductive yoke 20 may be provided with one edge magnetic conductive plate, or each side of the magnetic conductive yoke 20 is provided with one or more edge magnetic conductive plates, etc.

The vibration system comprises a diaphragm 41 and a voice coil 42, one end of the voice coil 42 is fixed to the diaphragm 41, and the other end of the voice coil 42 extends into the above magnetic gap. The diaphragm 41 comprises a center portion 411 and an edge portion 412 surrounding the center portion 411. In addition, the diaphragm 41 may further comprise a suspension annular portion 413 located between the center portion 411 and the edge portion 412. In other examples, the diaphragm 41 has a planar structure. The diaphragm 41 is made of PEEK or other polymer materials. The center portion 411 of the diaphragm 41 is further provided with a reinforcing layer. The reinforcing layer can effectively reduce the dividing vibration of the diaphragm 41 and reduce the noise of the sound generating device.

The housing 10 extends along the outer edge of the magnetic conductive yoke 20 and has an annular shape, and the housing 10 is coupled to the magnetic circuit system and the vibration system respectively. For example, the edge portion 412 of the diaphragm 41 is substantially coupled to the housing 10. That is, the housing 10 surrounds the edge portion 412 of the diaphragm 41. In addition, the housing 10 is also coupled to the magnetic conductive yoke 20 or the edge magnet 33. The housing 10, the magnetic conductive yoke 20 and the edge magnet 33 form a structure with an opening facing the diaphragm 41 together. It should be noted that the rectangular shaped housing 10 refers to a closed ring or an unclosed ring.

The sound generating device may have a rectangular shape, a circular shape, an oval shape, etc. Hereinafter, take a sound having a rectangular shape as an example to illustrate the present disclosure. As shown in the drawings, the sound generating device comprises two long sides and two short sides. The length of the long side is greater than that of the short side. The long and short sides of the voice coil 42, the diaphragm 41, the housing 10, and the magnetic circuit system correspond to the long and short sides of the sound generating device respectively.

In the embodiments of the present disclosure, the housing 10 extends along the edge of the magnetic conductive yoke 20 and has an annular shape, and a leakage opening 111 is formed in the gap between the housing 10 and the magnetic conductive yoke 20, and the leakage opening 111 is located at a side surface of the sound generating device.

Figure 5:
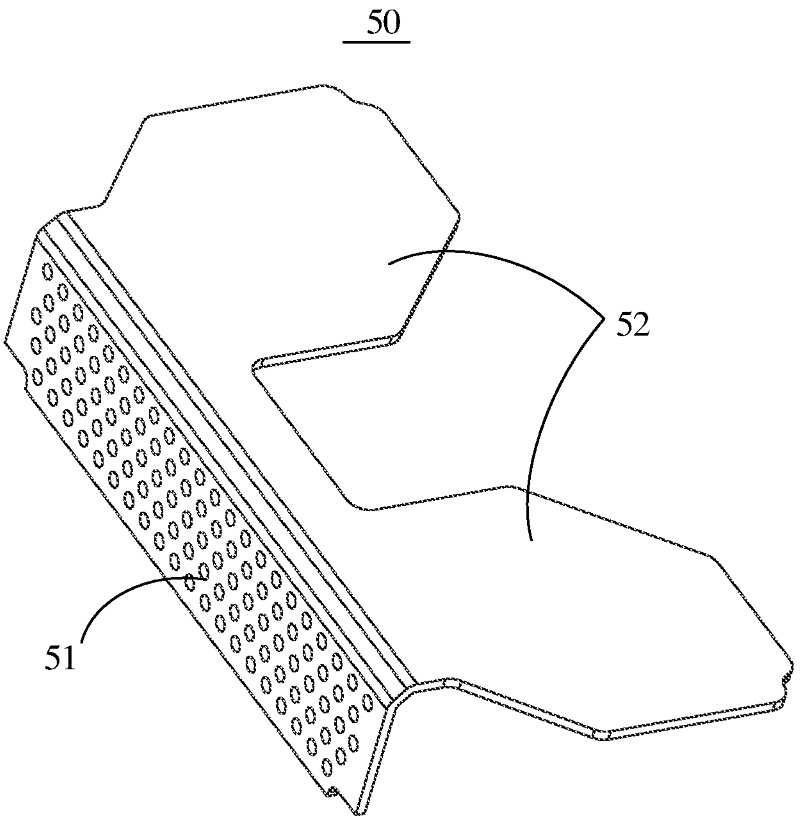
FIG. 5 is a schematic diagram of the structure of the metal mesh in FIG. 4.

Referring to FIG. 5, the sound generating device further comprises a metal mesh 50, which covers the leakage opening 111, and a portion of the metal mesh 50 corresponding to the leakage opening 111 is provided with a plurality of air holes.

It should be noted that the metal mesh 50 refers to a mesh structure with a plurality of meshes which are air holes. The leakage opening 111 leaks air through the meshes of the metal mesh 50, so that the inner space of the sound generating device maintains sound pressure balance between inner side and the outer side, and thus there is no need to provide a leakage opening structure additionally.

The metal mesh 50 may be coupled to either of the magnetic conductive yoke 20 and the housing 10, or the metal mesh 50 may be coupled to both the magnetic conductive yoke 20 and the housing 10. For example, in some embodiments, the metal mesh 50 is coupled to the magnetic conductive yoke 20 by welding or bonding.

In prior art, the mesh cloth is generally disposed on the leakage opening 111. However, since it is difficult to maintain the shape of the mesh cloth, a misalignment between the mesh cloth and the leakage opening 111 during integral injection molding or bonding may occur.

To solve the above problem, the present disclosure adopts a metal mesh, i.e., the metal mesh 50 mentioned above. On the one hand, the metal mesh 50 has large strength and hardness, and it can ensure that the metal mesh 50 has a stable shape even if the thickness of the metal mesh 50 is thin, so that the connection stability between the metal mesh 50 and the housing 10 or the magnetic conductive yoke 20 can be ensured, the misalignment between the metal mesh 50 and the leakage opening 111 can be prevented, thereby improving the yield of the products. On the other hand, the metal mesh 50 has high strength and may be used as a portion of the housing 10 at the same time, so that it can protect the structures such as the vibration system and magnetic circuit system inside the housing 10.

In an embodiment, the thickness of the metal mesh 50 is less than or equal to 0.2 mm. For example, the thickness of the metal mesh 50 may be provided as 0.2 mm, 0.115 mm, 0.1 mm, etc. The metal mesh 50 with the size in the above range has a small thickness, which can greatly reduce the space occupation of the device.

Figure 16:
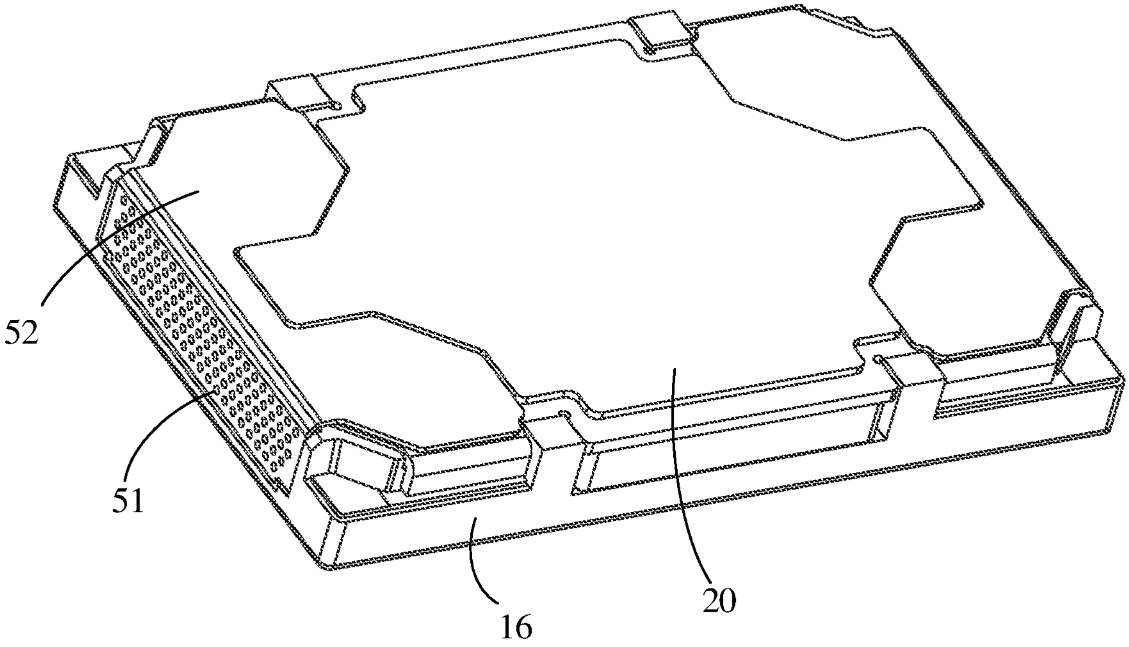
FIG. 16 is a schematic diagram of the structure of the sound generating device in FIG. 15 viewed from another perspective.
Figure 17:
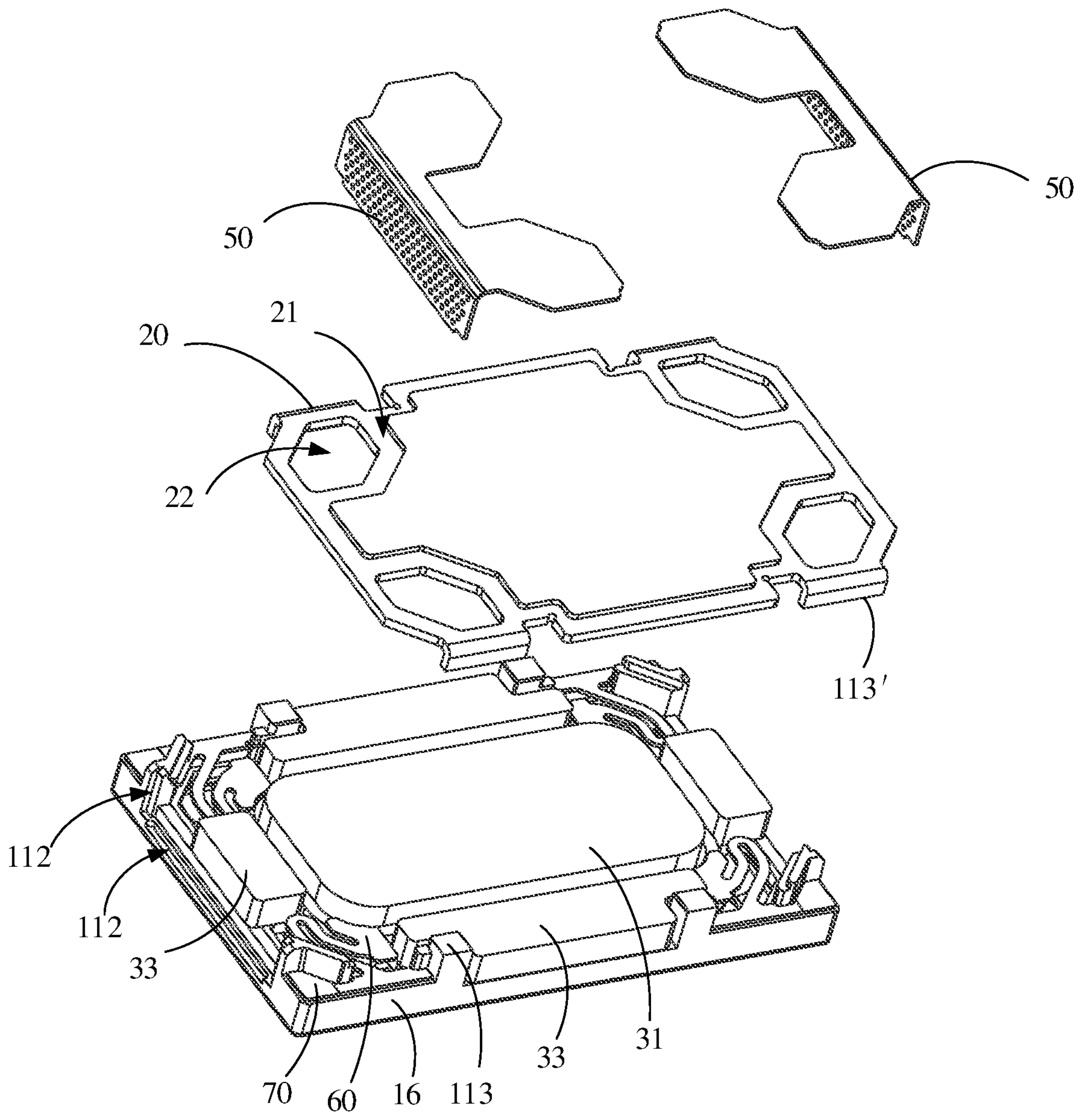
FIG. 17 is a schematic exploded perspective view of the sound generating device in FIG. 15.
Figure 18:
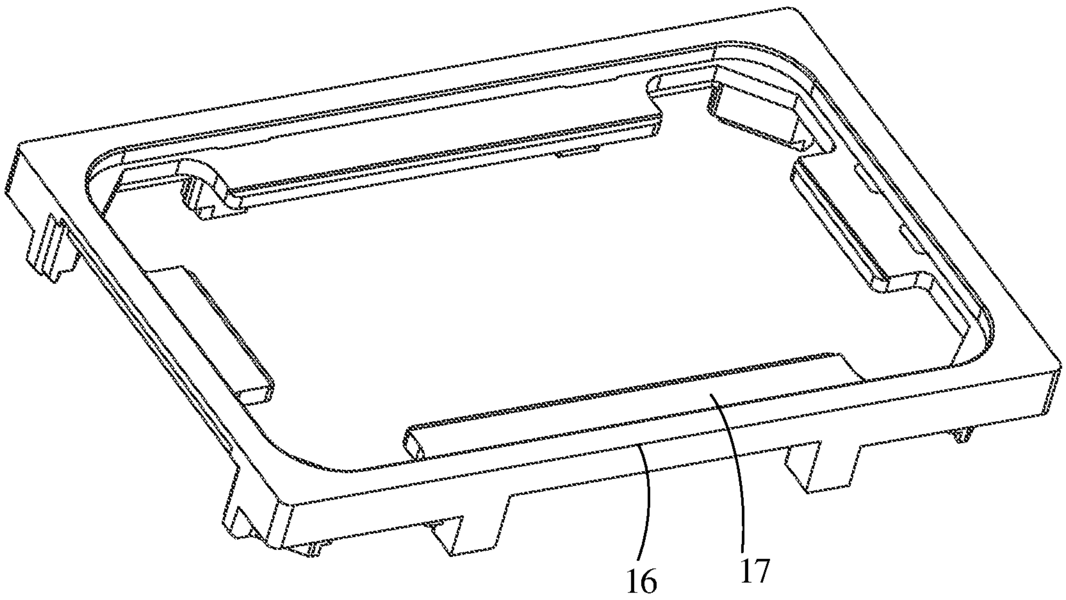
FIG. 18 is a schematic diagram of the structure of the housing in FIG. 17.
Figure 19:
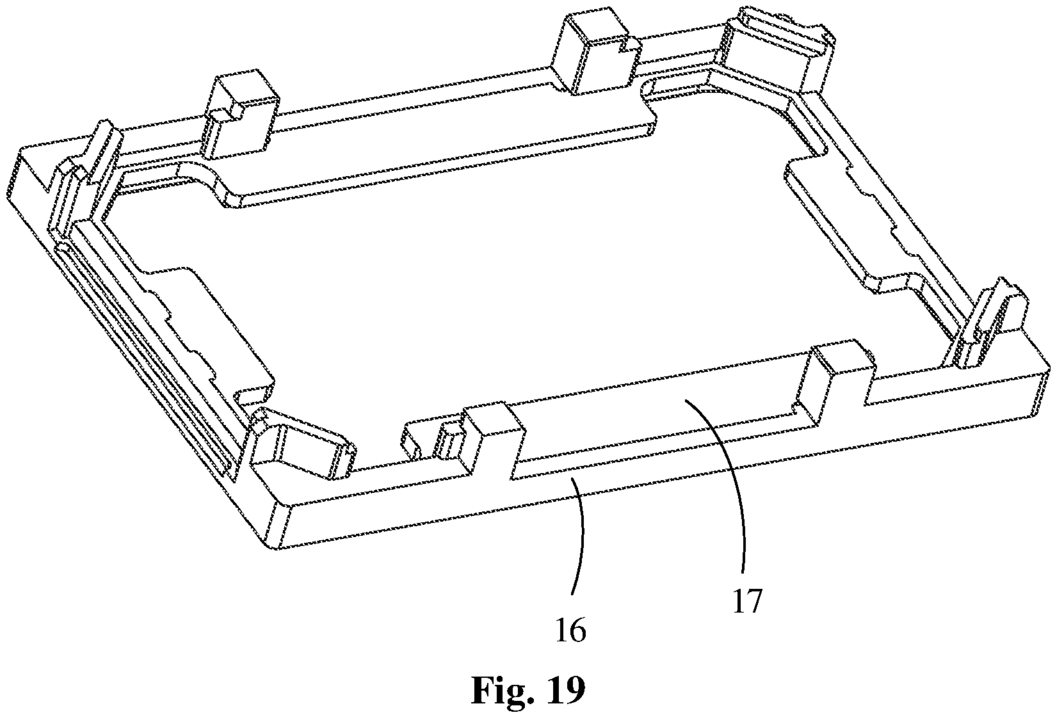
FIG. 19 is a schematic diagram of the structure of the housing in FIG. 18 viewed from another perspective.

Referring to FIGS. 16 and 17, the case where the metal mesh 50 is coupled to the magnetic conductive yoke 20 is described as an example to illustrate the present disclosure. Specifically, the metal mesh 50 comprises a cover section 51 and a connection section 52. The connection section 52 is coupled to the surface of the magnetic conductive yoke 20 away from the housing 10, the cover section 51 covers the leakage opening 111, and the cover section 51 is provided with a plurality of air holes. In this embodiment, the connection section 52 and the cover section 51 are combined to form an approximate L-shaped structure. The connection section 52 is provided on the surface of the magnetic conductive yoke 20 away from the housing 10, which can limit the movement of the whole metal mesh 50 towards the housing 10. In order to ensure the strength, the connection section 52 may not be provided with air holes, and only the cover section 51 may be provided with a plurality of air holes. That is, the connection section 52 is a plate body without holes, and the cover section 51 is a meshed plate. Of course, the connection section 52 may also be provided with air holes if necessary.

In addition, the connection section 52 is coupled to the magnetic conductive yoke 20 by welding or bonding.

In an embodiment, the surface of the magnetic conductive yoke 20 away from the housing 10 is provided with an escape groove 21, and the connection section 52 is located in the escape groove 21. It should be noted that the connection section 52 is adapted to the escape groove 21. That is, the connection section 52 may be substantially in contact with the groove wall of the escape groove 21, and the connection section 52 and the escape groove 21 are coupled with each other, thereby limiting the movement of the connection section 52. Optionally, the surface of the connection section 52 away from the housing 10 is on the same plane with the surface of the magnetic conductive yoke 20 away from the housing 10, or the surface of the connection section 52 away from the housing 10 is lower than the surface of the magnetic conductive yoke 20 away from the housing 10. On the one hand, the escape groove 21 can limit the movement of the connection section 52 to prevent the connection section 52 from moving along the plate surface of the magnetic conductive yoke 20. On the other hand, the connection section 52 is prevented from protruding outside the magnetic conductive yoke 20 and occupying too much space of the device, thereby ensuring the miniaturization of the sound generating device. In addition, since the connection section 52 is formed of metal, the escape groove 21 at the magnetic conductive yoke 20 may be filled to ensure the magnetic conductive effect of the magnetic conductive yoke 20.

In an embodiment, the vibration system further comprises a support piece 60, which is located at one end of the voice coil 42 close to the magnetic conductive yoke 20, and the support piece 60 is electrically connected to the voice coil 42. The magnetic conductive yoke 20 is provided with an escape hole 22 corresponding to the support piece 60, and the connection section 52 covers the escape hole 22. The escape hole 22 provides an escape space for the vibration of the support piece 60. In the embodiment provided with the escape groove 21, the escape hole 22 is provided at the bottom of the escape groove 21.

For the embodiment in which the sound generating device has a rectangular shape, each of the four corners of the sound generating device is provided with one support piece 60, and each of the four corners of the magnetic conductive yoke 20 is provided with one escape hole 22. In this way, the connection section 52 may be an integral plate body, which covers all of the four escape holes 22, or the connection section 52 has a ring structure, a cross structure, etc.

In an embodiment, the sound generating device has a rectangular shape, and each of the two short sides of the sound generating device is provided with one leakage opening 111, and each leakage opening 111 is provided with one metal mesh 50 correspondingly. The formation of two leakage openings 111 can enhance the overall pressure relief effect.

In this embodiment, the connection section 52 comprises two cover plates and a connection plate connecting the two cover plates. The two cover plates are provided corresponding to the two escape holes 22, which can reduce the area of the connection section 52 and the cover area of the escape groove 21, so as to ensure the strength of the magnetic conductive yoke 20.

In order to ensure the accurate alignment of the metal mesh 50 and the leakage opening 111, in an embodiment, an insertion port 112 is provided at the housing 10 and the side wall of the leakage opening 111, and the metal mesh 50 is inserted into the insertion port 112. Specifically, both the surface of the housing 10 facing the magnetic conductive yoke 20 and the adjacent surface thereof are provided with the insertion port 112. During assembly, the metal mesh 50 is inserted from the side where the magnetic conductive yoke 20 is located to the side where the housing 10 is located, the cover section 51 of the metal mesh 50 moves towards the housing 10 along the edge of the magnetic conductive yoke 20, and is inserted into the insertion ports 112 at the hole flange at the opposite sides of the leakage opening 111, and the cover section 51 moves towards the housing 10 along the insertion ports 112, and is inserted into the insertion ports 112 at the surface of the housing 10 facing the magnetic conductive yoke 20 finally. In this way, the contact area between the metal mesh 50 and the housing 10 can be ensured, and the displacement of the metal mesh 50 can be better limited.

Referring to FIG. 2 again, in an embodiment, the edge of at least one of the magnetic conductive yoke 20 and the housing 10 is provided with a plurality of stop walls 113, and the stop walls 113 of one of the magnetic conductive yoke 20 and the housing 10 extend towards and abut on the other one of the magnetic conductive yoke 20 and the housing 10, wherein the leakage opening 111 is formed by the space between adjacent two stop walls 113.

For example, the housing 10 is provided with a plurality of stop walls 113, which extend towards the side where the magnetic conductive yoke 20 is located and abut on the magnetic conductive yoke 20. The interval between some stop walls 113 may be covered by the edge magnet 33, and the interval between other stop walls 113 may form the leakage opening 111.

In the rectangular sound generating device, the edge magnet 33 at the long side blocks the interval between the adjacent two stop walls 113, and the interval between the two stop walls 113 at the short side forms the leakage opening 111.

The stop walls 113 can ensure that the magnetic conductive yoke 20 and the housing 10 are provided to be spaced apart from each other to form the leakage opening 111 and thus it is unnecessary to form a hole on the magnetic conductive yoke 20. In addition, the stop walls 113 can limit the movement of the edge magnet 33 by abutting on the edge of the edge magnet 33.

In addition, the leakage opening 111 may also be formed by the housing 10, the magnetic conductive yoke 20 and the edge magnet 33 together.

In an embodiment, a plurality of groups of locating structures 114 are formed between the magnetic conductive yoke 20 and the housing 10. Each group of locating structures 114 comprises two stop walls 113 provided at the housing 10 and one stop wall 113' provided at the magnetic conductive yoke 20. The stop wall 113' of the magnetic conductive yoke 20 is clamped between the two stop walls 113 of the housing 10. The leakage opening 111 is formed by the interval between adjacent two groups of the locating structures 114.

In the same group of the locating structures 114, the three stop walls 113 form a mutually stopper structure, so they can restrain each other to prevent relative movement. Meanwhile, the stop wall 113' at the magnetic conductive yoke 20 is coupled to the two stop walls 113 at the housing 10 to form a complete stop wall 113, thereby preventing a gap formed therebetween.

In this embodiment, the stop wall 113 at the housing 10 forms a hole flange of the leakage opening 111, and the stop wall 113 is provided with the insertion port 112, which extends in the arrangement direction of the housing 10 and the magnetic conductive yoke 20.

The above housing 10 may be formed of or a plastic, or the housing 10 may be formed as a combination of metal and plastic. The structure of the housing 10 is described in detail below through two embodiments, but it is not limited thereto.

Referring to FIGS. 1 to 14, in an embodiment, the housing 10 comprises a case portion 12 and a mounting portion 15. The case portion 12 is a metal part, the case portion 12 extends along the outer edge of the magnetic conductive yoke 20 and has an annular shape, the surface of the case portion 12 facing the magnetic conductive yoke 20 is provided with an escape notch 144, and the escape notch 144 penetrates through the outer edge of the case portion 12 outwardly. The mounting portion 15 is provided in the escape notch 144, and the mounting portion 15 may be a part formed of plastic and is integrally molded with the case portion 12 by injection molding.

Generally, the housing 10 in prior art is a part formed of plastic. Due to the low coefficient of heat conduction of the plastic part, its heat dissipation performance is poor, which easily affects the sound output effect of the sound generating device. In view of the above, the case portion 12 of the housing 10 in the embodiments of the present disclosure is formed of metal, i.e., the metal housing 10. Due to the high coefficient of heat conduction of the metal, the housing 10 can better dissipate heat, so that the heat dissipation effect of the sound generating device can be improved.

Referring to FIGS. 6 to 11, in an embodiment, the case portion 12 is formed by a combination of a plurality of parts. For example, the case portion 12 comprises a metal ring 13 and an annular magnetic conductive plate 14 which are stacked one on another, the metal ring 13 extends along the edge portion 412 and is coupled to the edge portion 412, and the annular magnetic conductive plate 14 is provided on the edge magnet 33. Here, the metal ring 13 and the annular magnetic conductive plate 14 are molded separately, and are assembled finally, for example, the metal ring 13 and the annular magnetic conductive plate 14 are bonded or welded together. Of course, the metal ring 13 and the annular magnetic conductive plate 14 may also be integrally molded. In addition, the metal ring 13 and the annular magnetic conductive plate 14 are stacked one on another, which means that both of them has an annular shape, and the ring-shaped main portions of them are attached to each other.

The annular magnetic conductive plate 14 surrounds the periphery of the central magnetic conductive plate 32 and is spaced apart from the central magnetic conductive plate 32, and the gap formed between them and the gap formed between the edge magnet 33 and the central magnet 31 together constitute the above magnetic gap. In this embodiment, the annular magnetic conductive plate 14 not only has the effect of magnetism conduction, but also may be used as a portion of the housing 10, so that it can protect the vibration system and magnetic circuit system inside the housing.

The metal ring 13 and the annular magnetic conductive plate 14 may be made of metal material such as copper, iron, nickel, etc. Metal materials have the characteristics of fast heat conduction and good heat dissipation effect. This makes the temperature of voice coil 42 and the surface temperature of the sound generating device lower and the temperature resistance better under the same power of the sound generating device.

In this embodiment, the annular magnetic conductive plate 14 does not completely cover the metal ring 13. For example, a portion of the outer edge of the annular magnetic conductive plate 14 is provided with the escape notch 144, and the metal ring 13 has a mounting area 131 exposed by the escape notch 144. The escape notch 144 in this embodiment may be a structure penetrating through two opposite surfaces of the annular magnetic conductive plate 14 in the vibration direction of the vibration system, wherein the vibration direction of the vibration system is the vibration direction of the diaphragm 41, i.e., the arrangement direction of the magnetic conductive yoke 20 and the diaphragm 41. In this way, a portion of the surface of the metal ring 13 facing the magnetic conductive yoke 20 may be exposed at the position where the escape notch 144 is provided.

The mounting portion 15 is provided in the mounting area 131, and the mounting portion 15 is a plastic part and is integrally molded with the metal ring 13 and the annular magnetic conductive plate 14 by injection molding. The metal ring 13 and the annular magnetic conductive plate 14 are placed at their respective positions in the injection mold before injection molding, then the injection molding material is injected into the mold, and fills the escape notch 144 at the mounting area 131, and a fixed connection is formed therebetween after the injection molding material is cured, so that the mounting portion 15 is formed.

In this embodiment, the mounting portion 15 fills the position of the escape notch 144, so that the escape notch 144 may be fully filled, thereby ensuring the integrity of the housing 10, and preventing an opening formed therein. The escape notch 144 provides a space for accommodating the mounting portion 15 and prevents the housing 10 from becoming too thick at the position where the mounting portion 15 is provided. In addition, the mounting portion 15 may be in contact with the mounting area 131 at the metal ring 13 and the edge of the escape notch 144 at the annular magnetic conductive plate 14 simultaneously, thereby connecting the metal ring 13 and the annular magnetic conductive plate 14 simultaneously, so that the relative movement between the metal ring 13 and the annular magnetic conductive plate 14 is prevented. In addition, by providing the plastic mounting portion 15 on the housing 10, it may be used to form some more complex structures by injection molding. For example, some locating structures 114 may be formed, so as to facilitate the molding of the housing 10.

In addition, the pad 70 may be provided on the mounting portion 15 which provides a space for disposing the pad 70. The lead wire connected to the voice coil 42 leads out and then welded to the pad 70 on the mounting portion 15.

The pad 70 is coupled to the mounting portion 15 by bonding. In some embodiments, the mounting portion 15 is not provided with the pad 70.

For the rectangular sound generating device, each of the metal ring 13 and the annular magnetic conductive plate 14 has a rectangular shape. In an embodiment, the escape notch 144 is located at the corner of the annular magnetic conductive plate 14, and the mounting area 131 is located at the corner of the metal ring 13. Optionally, each of the four corners of the annular magnetic conductive plate 14 is provided with one escape notch 144, and each of the four corners of the metal ring 13 is provided with one mounting area 131. In this way, each of the four corners of the sound generating device is provided with one mounting portion 15. In this embodiment, the escape notch 144 is formed by removing the corner of the annular magnetic conductive plate 14.

Figure 10:
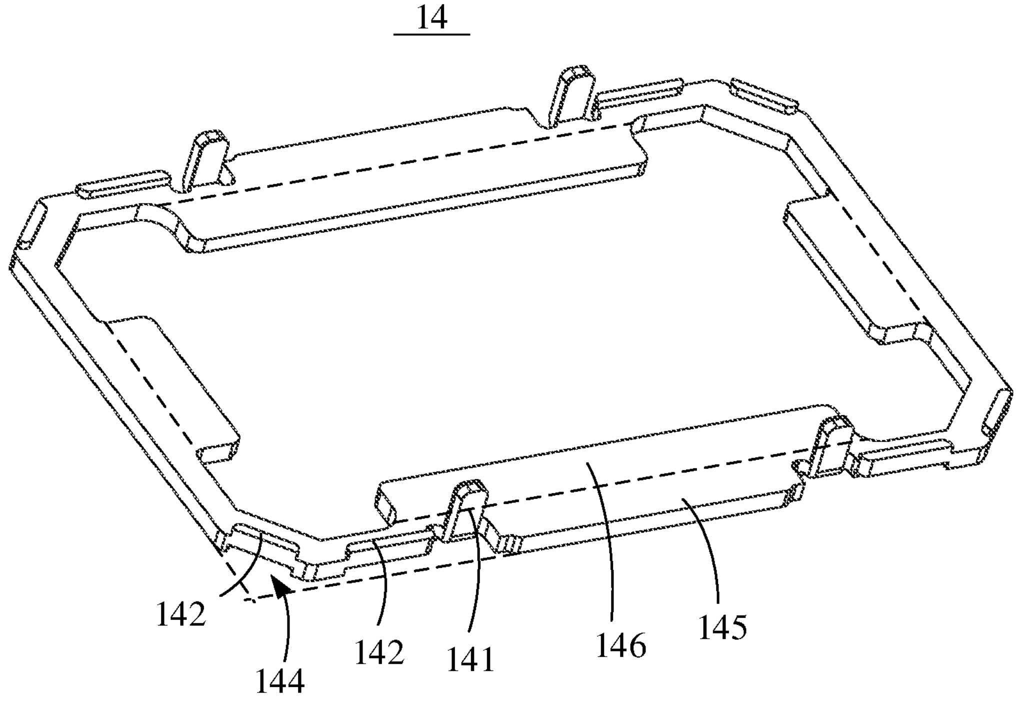
FIG. 10 is a schematic diagram of the structure of the annular magnetic conductive plate in FIG. 7.
Figure 12:
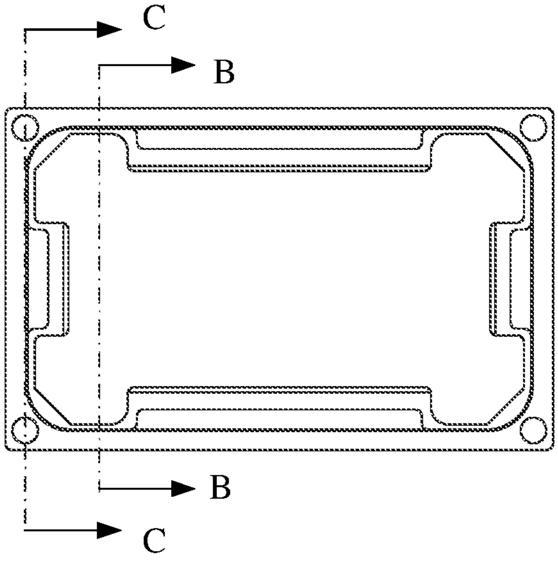
FIG. 12 is a schematic plan view of the housing in FIG. 6.
Figure 13:
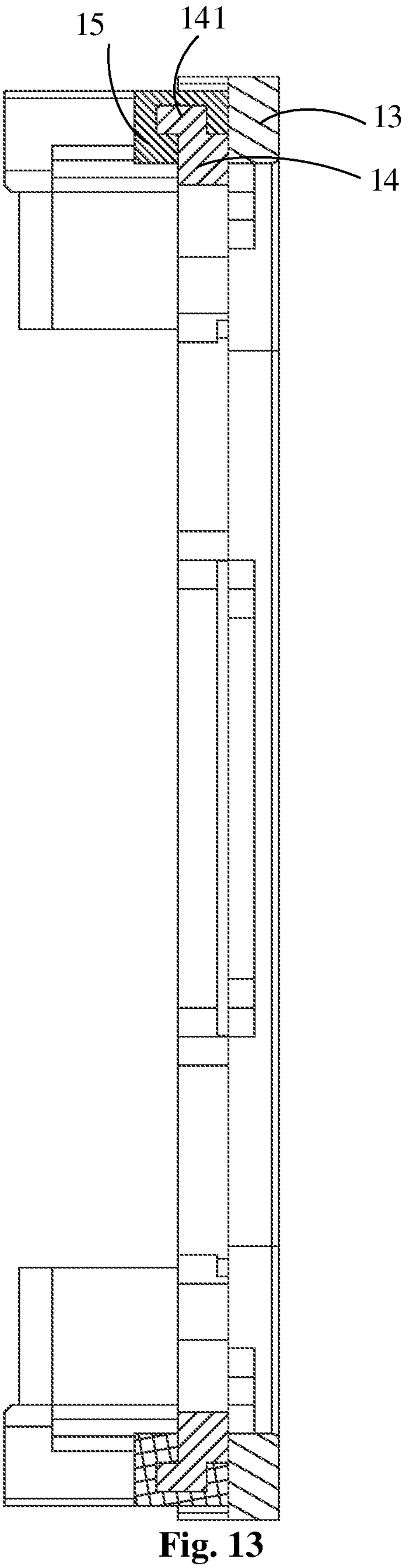
FIG. 13 is a schematic cross-section view of the housing in FIG. 12 taken along line B-B.

Referring to FIGS. 10, 12 and 13, in an embodiment, a locating boss 141 is provided at the annular magnetic conductive plate 14 and the edge of the escape notch 144, the locating boss 141 extends towards the edge magnet 33, and the locating boss 141 is at least partially wrapped in the mounting portion 15. The structure formed by the combination of the locating boss 141 and the mounting portion 15 abuts on the edge of the edge magnet 33. The locating boss 141 may provide more attachment area for the mounting portion 15, so that the contact area between the mounting portion 15 and the annular magnetic conductive plate 14 can be ensured, and the connection stability of the mounting portion 15 can be ensured. During injection molding, the mounting portion 15 may wrap the whole locating boss 141 or a portion of the locating boss 141, and a cylindrical structure (i.e., the above stop wall 113) finally formed by them abuts on the side edge of the edge magnet 33, which has the effect of locating the edge magnet 33.

For example, the sound generating device has a rectangular structure, the locating boss 141 is located at the long side of the sound generating device, and the cylindrical structure formed by the locating boss 141 and the mounting portion 15 together abuts on the edge magnet 33 located at the long side of the sound generating device. Optionally, the same long side is provided with two locating bosses 141, and two cylindrical structures formed by the two locating bosses 141 and the mounting portion 15 abut on two opposite ends of the same edge magnet 33 respectively, wherein the two opposite ends refer to two opposite ends distributed along the long side. In order to prevent the displacement of the edge magnet 33, the edge magnet 33 may be provided with a notch, and the cylindrical structure formed by the locating boss 141 and the mounting portion 15 abuts on the notch, so that the displacement of the edge magnet 33 in the length direction and width direction can be limited at the same time.

In order to further improve the connection stability of the mounting portion 15, in an embodiment, a gripping boss 142 is further provided at the annular magnetic conductive plate 14 and the edge of the escape notch 144, the gripping boss 142 extends towards the edge magnet 33, and the gripping boss 142 is wrapped in the mounting portion 15. Optionally, the annular magnetic conductive plate 14 is provided with a plurality of gripping bosses 142, and the plurality of gripping bosses 142 and the locating bosses 141 are spaced along the circumferential direction of the annular magnetic conductive plate 14, so that the connection area between the mounting portion 15 and the annular magnetic conductive plate 14 is increased at a plurality of positions in the circumferential direction of the annular magnetic conductive plate 14.

Figure 11:
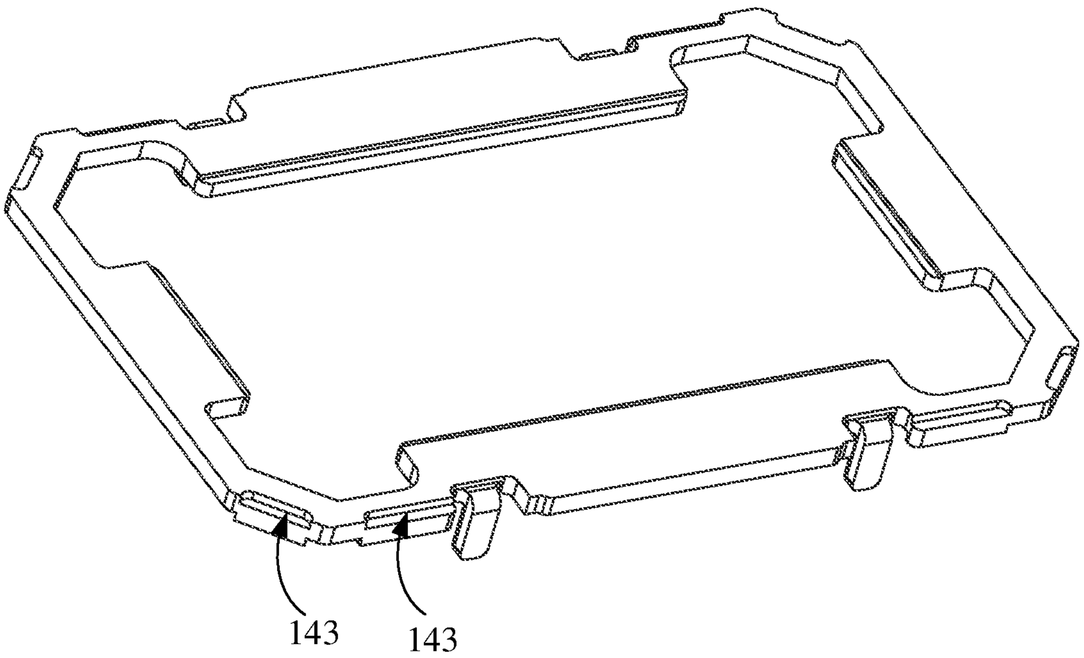
FIG. 11 is a schematic diagram of the structure of the annular magnetic conductive plate in FIG. 10 viewed from another perspective.

Referring to FIG. 11, in an embodiment, the annular magnetic conductive plate 14 is further provided with a gripping groove 143. The gripping groove 143 is provided adjacent to the edge of the escape notch 144, and the mounting portion 15 fills the gripping groove 143, so that an embedded structure is formed between the mounting portion 15 and the gripping groove 143, thereby greatly improving the connection effect between the mounting portion 15 and the annular magnetic conductive plate 14.

The gripping groove 143 is located at the surface of the annular magnetic conductive plate 14 facing the metal ring 13 and penetrates through the edge of the escape notch 144. In this way, during the injection molding forming the mounting portion 15, the injection molding material can flow into the gripping groove 143 between the annular magnetic conductive plate 14 and the metal ring 13, so that the contact areas between the mounting portion 15 and the annular magnetic conductive plate 14 as well as the metal ring 13 is increased simultaneously, and the fixation effect among them are effectively improved. In other embodiments, the gripping groove 143 may be provided at the notch wall of the escape notch 144, or at the surface of the annular magnetic conductive plate 14 facing the magnetic conductive yoke 20.

Figure 8:
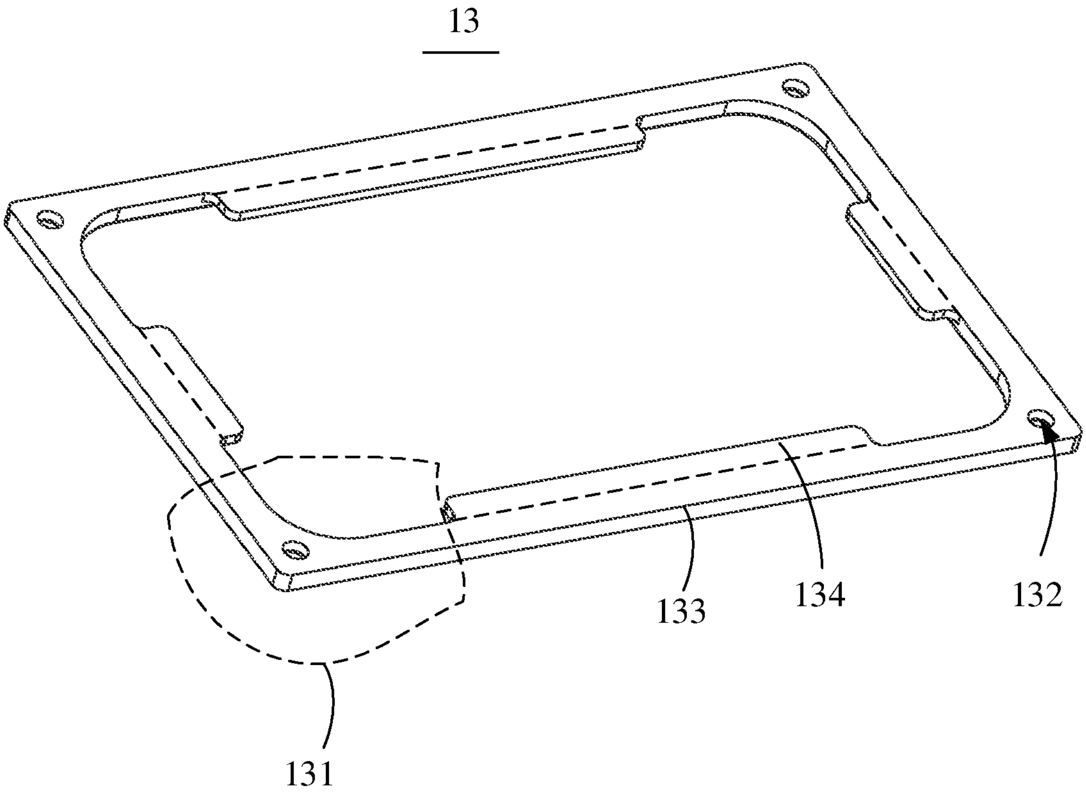
FIG. 8 is a schematic diagram of the structure of the metal ring in FIG. 7.
Figure 9:
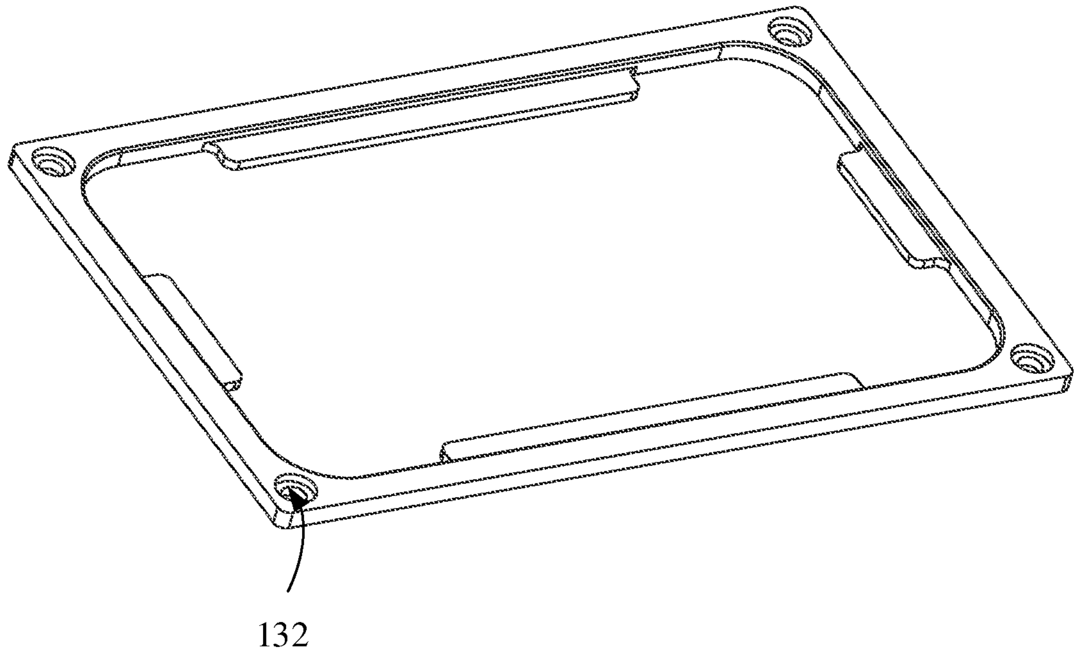
FIG. 9 is a schematic diagram of the structure of the metal ring in FIG. 8 viewed from another perspective.
Figure 14:
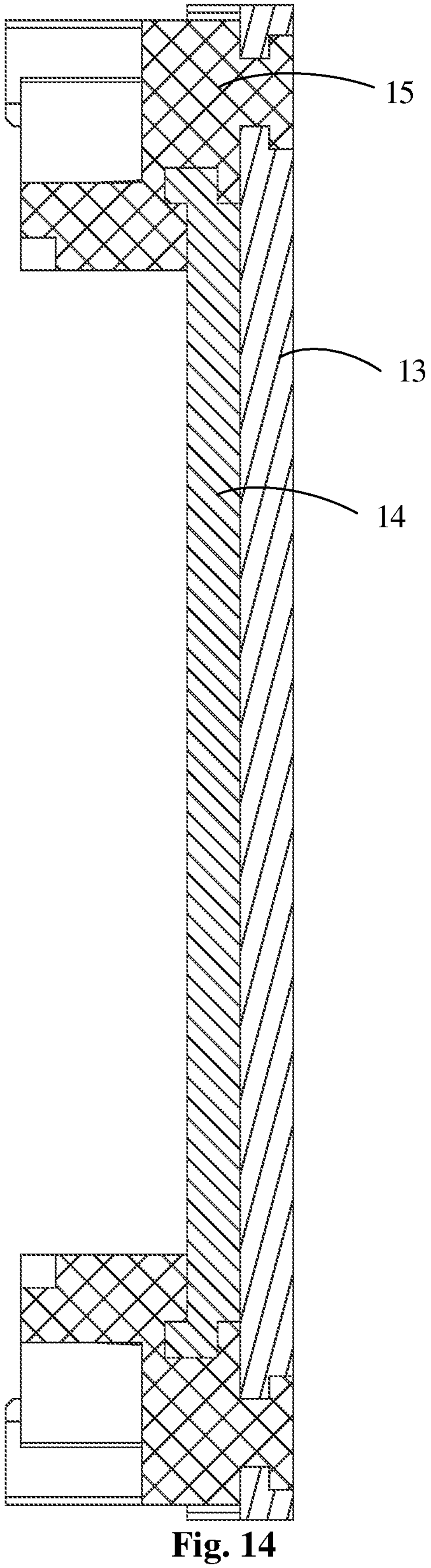
FIG. 14 is a schematic cross-section view of the housing in FIG. 12 taken along line C-C.
Figure 15:
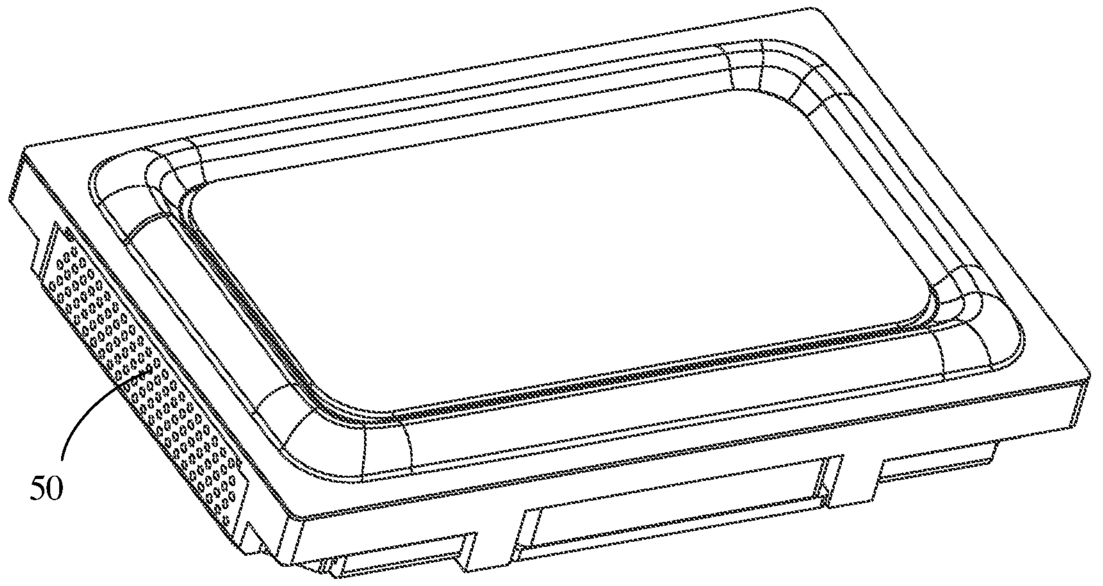
FIG. 15 is a schematic diagram of the structure of the sound generating device according to another embodiment of the present disclosure.

Referring to FIGS. 8, 9 and 14, in an embodiment, in order to further increase the connection area between the mounting portion 15 and the metal ring 13, the mounting area 131 is further provided with a gripping hole 132, and the mounting portion 15 fills the gripping hole 132. Optionally, the diameter of one end of the gripping hole 132 close to the annular magnetic conductive plate 14 is smaller than that of the other end. For example, the gripping hole 132 is a stepped hole. In this case, after the mounting portion 15 is molded, the mounting portion 15 located in the gripping hole 132 abuts on the step surface of the stepped hole, and thus the mounting portion 15 can be prevented from detaching in the direction towards the annular magnetic conductive plate 14. Of course, the gripping hole 132 may also be a hole the diameter of which gradually expanded.

Referring to FIGS. 8 and 10, the metal ring 13 comprises a first annular body 133 and a plurality of first edge washers 134, which are distributed at the inner edge of the first annular body 133 along the circumferential direction of the first annular body 133 and are spaced apart from each other. The annular magnetic conductive plate 14 comprises a second annular body 145 and a plurality of second edge washers 146, which are distributed at the inner edge of the second annular body 145 along the circumferential direction of the second annular body 145 and are spaced apart from each other. Each of the plurality of first edge washers 134 and the plurality of second edge washers 146 are provided at corresponding positions, the corresponding first edge washer 134 and second edge washer 146 are stacked, and the first annular body 133 and the second annular body 145 are stacked.

For the rectangular sound generating device, each of the first annular body 133 and the second annular body 145 has a rectangular ring structure. Each side of the first annular body 133 is provided with one first edge washer 134, and each side of the second annular body 145 is provided with one second edge washer 146. Of course, the number and structure of the first edge washer 134 and the second edge washer 146 may be provided to correspond to or the same as those of the edge magnet 33.

In this embodiment, the edge magnetic conductive plate of the sound generating device is formed by laminating the first edge washer 134 and the second edge washer 146 together, which can ensure that the edge magnetic conductive plate has a large thickness, so that the magnetic conductive effect of the edge magnetic conductive plate is more significant, and the magnetic induction intensity of the magnetic gap is stronger.

Referring to FIGS. 15 to 19, in an embodiment, the housing 10 comprises a plastic case 16 and a metal washer 17, each of the plastic case 16 and the metal washer 17 has an annular shape, and the plastic case 16 and the metal washer 17 are integrally molded by injection molding.

The metal washer 17 comprises a third annular body and a third edge washer, the third edge washer is provided at the inner circumferential surface of the third annular body. In addition, similarly, a plurality of third edge washers may be provided at the inner circumferential surface of the third annular body.

The plastic case 16 substantially wraps the third annular body, and the third edge washer is exposed outside the plastic case 16. A stop wall 113 is molded at the plastic case 16. By providing the stop wall 113 at the plastic case 16, the integral injection molding of the stop wall 113 is facilitated.

The above embodiments are only the preferred embodiments of the present disclosure, and do not limit the patent scope of the present disclosure. Under the invention concept of the present disclosure, the equivalent structural transformation made by using the contents of the description and drawings of the present disclosure, and the direct/indirect application in other relevant technical fields all fall into the patent protection scope of the present disclosure.

What is claimed is:

1. A sound generating device, comprising:

a magnetic conductive yoke;

a housing extending along an edge of the magnetic conductive yoke and having an annular shape, wherein a leakage opening is formed in a gap between the housing and the magnetic conductive yoke; and a metal mesh covering the leakage opening, wherein a portion of the metal mesh corresponding to the leakage opening is provided with a plurality of air holes, wherein the metal mesh comprises a cover section and a connection section, the connection section is coupled to a surface of the magnetic conductive yoke away from the housing, the cover section covers the leakage opening, and the cover section is provided with the plurality of air holes.

2. The sound generating device according to claim 1, wherein the surface of the magnetic conductive yoke away from the housing is provided with an escape groove, and the connection section is located in the escape groove.

3. The sound generating device according to claim 1, wherein the connection section is coupled to the magnetic conductive yoke by welding or bonding.

4. The sound generating device according to claim 1, further comprising a magnetic circuit system and a vibration system, wherein the magnetic circuit system comprises a central magnet and an edge magnet surrounding the central magnet, and a magnetic gap is formed between the central magnet and the edge magnet, wherein the vibration system comprises a diaphragm, a voice coil and a support piece, and the voice coil extends into the magnetic gap, wherein the support piece is located at one end of the voice coil close to the magnetic conductive yoke, and the support piece is electrically coupled to the voice coil, and wherein a portion of the magnetic conductive yoke corresponding to the support piece is provided with an escape hole, and the connection section covers the escape hole.

5. The sound generating device according to claim 4, wherein the sound generating device has a rectangular shape, each of four corners of the sound generating device is provided with one support piece, and each of four corners of the magnetic conductive yoke is provided with one escape hole correspondingly.

6. The sound generating device according to claim 1, wherein an insertion port is provided at the housing and a side wall of the leakage opening, and the metal mesh is inserted into the insertion port.

7. The sound generating device according to claim 1, wherein an edge of at least one of the magnetic conductive yoke and the housing is provided with a plurality of stop walls, the stop walls of one of the magnetic conductive yoke and the housing extend towards and abut on the other one of the magnetic conductive yoke and the housing, and wherein the leakage opening is formed by a space between adjacent two stop walls.

8. The sound generating device according to claim 7, wherein a plurality of groups of locating structures are formed between the magnetic conductive yoke and the housing, and each group of the locating structures comprises two stop walls provided at the housing and one stop wall provided at the magnetic conductive yoke, and wherein the stop wall of the magnetic conductive yoke is clamped between the two stop walls of the housing, and the leakage opening is formed by an interval between adjacent two groups of the locating structures.

9. The sound generating device according to claim 1, wherein the sound generating device has a rectangular shape, and each of two short sides of the sound generating device is provided with one leakage opening, and each leakage opening is provided with one metal mesh correspondingly.

10. The sound generating device according to claim 1, wherein a thickness of the metal mesh is less than or equal to 0.2 mm.

11. The sound generating device according to claim 1, wherein the housing comprises a case portion and a mounting portion, the case portion is a metal part, the case portion extends along an outer edge of the magnetic conductive yoke and has an annular shape, a surface of the case portion facing the magnetic conductive yoke is provided with an escape notch, and the escape notch penetrates through an outer edge of the case portion outwardly, and wherein the mounting portion is provided in the escape notch, and the mounting portion is a plastic part, and is integrally molded with the case portion by injection molding.

12. The sound generating device according to claim 11, wherein the case portion comprises a metal ring and an annular magnetic conductive plate which are stacked one on another, the metal ring is coupled to an edge portion of a diaphragm, the annular magnetic conductive plate is provided on an edge magnet, a portion of an outer edge of the annular magnetic conductive plate is provided with an escape notch, the metal ring has a mounting area exposed by the escape notch, and the mounting portion is provided in the mounting area.

13. The sound generating device according to claim 1, wherein the housing comprises a plastic case and a metal washer, each of the plastic case and the metal washer has an annular shape, and the plastic case and the metal washer are integrally molded by injection molding.

* * * * *